US010996313B2

(12) United States Patent
Goswami et al.

(10) Patent No.: US 10,996,313 B2
(45) Date of Patent: May 4, 2021

(54) FMCW RADAR REDUCED POWER MODE

(71) Applicant: TEXAS INSTRUMENTS INCORPORATED, Dallas, TX (US)

(72) Inventors: Piyali Goswami, Bangalore (IN); Sandeep Rao, Bangalore (IN); Sachin Bharadwaj, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 263 days.

(21) Appl. No.: 16/173,795

(22) Filed: Oct. 29, 2018

(65) Prior Publication Data
US 2020/0132811 A1    Apr. 30, 2020

(51) Int. Cl.
  *G01S 7/40*    (2006.01)
  *G01S 7/41*    (2006.01)
  *G01S 13/536*    (2006.01)
  *G01S 13/56*    (2006.01)
  *G01S 7/35*    (2006.01)

(52) U.S. Cl.
  CPC .......... *G01S 7/4008* (2013.01); *G01S 7/352* (2013.01); *G01S 7/40* (2013.01); *G01S 7/415* (2013.01); *G01S 13/536* (2013.01); *G01S 13/56* (2013.01)

(58) Field of Classification Search
  CPC .......... G01S 7/4008; G01S 7/352; G01S 7/40
  See application file for complete search history.

(56) References Cited

U.S. PATENT DOCUMENTS

| 2011/0119515 A1* | 5/2011 | Sadwick | ........... H02J 13/00002 |
| | | | 13/2 |
| 2012/0194377 A1* | 8/2012 | Yukumatsu | ............... G01S 7/35 |
| | | | 342/70 |
| 2012/0235855 A1* | 9/2012 | Kurtz | ........................ G01S 7/35 |
| | | | 342/109 |

(Continued)

FOREIGN PATENT DOCUMENTS

| CN | 105301592 A | 2/2016 |
| RU | 2652261 C2 | 4/2018 |
| WO | 2018138725 A1 | 8/2018 |

OTHER PUBLICATIONS

International Search Report and Written Opinion, PCT Application No. PCT/US2019/058617, 9 pages.

*Primary Examiner* — Marcus E Windrich
(74) *Attorney, Agent, or Firm* — Brian D. Graham; Charles A. Brill; Frank D. Cimino (57) ABSTRACT

A method of operating a frequency modulated continuous wave (FMCW) radar system includes receiving, by at least one processor, digital intermediate frequency (IF) signals from a mixer coupled to a receive antenna. The method also includes computing, by the at least one processor, a motion metric based on the digital IF signals; operating, by the at least one processor, the FMCW radar system in a classification mode, in response to determining that the motion metric is above a threshold; and operating, by the at least one processor, the FMCW radar system in a detection mode, in response to determining that the motion metric is below the threshold for at least a first amount of time. An amount of power consumed by the FMCW radar system in the detection mode is less than an amount of power consumed by the FMCW radar system in the classification mode.

18 Claims, 5 Drawing Sheets

(56) References Cited

U.S. PATENT DOCUMENTS

| | | | |
|---|---|---|---|
| 2016/0252607 A1* | 9/2016 | Saboo | G01S 7/415 |
| | | | 342/107 |
| 2018/0059216 A1* | 3/2018 | Onic | G01S 7/352 |
| 2018/0136324 A1* | 5/2018 | Klotzbuecher | G01S 13/343 |
| 2019/0056498 A1* | 2/2019 | Sonn | G01S 17/89 |

* cited by examiner

FMCW RADAR REDUCED POWER MODE

SUMMARY

In accordance with at least one example of the disclosure, a method of operating a frequency modulated continuous wave (FMCW) radar system includes receiving, by at least one processor, digital intermediate frequency (IF) signals from a mixer coupled to a receive antenna. The method also includes computing, by the at least one processor, a motion metric based on the digital IF signals; operating, by the at least one processor, the FMCW radar system in a classification mode, in response to determining that the motion metric is above a threshold; and operating, by the at least one processor, the FMCW radar system in a detection mode, in response to determining that the motion metric is below the threshold for at least a first amount of time. An amount of power consumed by the FMCW radar system in the detection mode is less than an amount of power consumed by the FMCW radar system in the classification mode.

In accordance with another example of the disclosure, a frequency modulated continuous wave (FMCW) radar system includes a receive antenna and a receive channel coupled to the receive antenna. The receive channel is configured to generate a digital intermediate frequency (IF) signal from a radio frequency signal received by the receive antenna. The FMCW radar system also includes a processor coupled to the receive channel. The processor is configured to compute a motion metric based on the digital IF signals; operate the FMCW radar system in a classification mode, in response to determining that the motion metric is above a threshold; and operate the FMCW radar system in a detection mode, in response to determining that the motion metric is below the threshold for at least a first amount of time. An amount of power consumed by the FMCW radar system in the detection mode is less than an amount of power consumed by the FMCW radar system in the classification mode.

BRIEF DESCRIPTION OF THE DRAWINGS

For a detailed description of various examples, reference will now be made to the accompanying drawings in which.

DETAILED DESCRIPTION

Frequency-modulated continuous wave (FMCW) radar systems may be embedded in multiple usage applications, such as industrial applications, automotive applications, and the like. As the cost of FMCW radar transceiver integrated circuits (ICs) becomes lower over time, FMCW radar systems are increasingly suitable for gesture recognition applications, such as controlling devices around the home (e.g., a thermostat, lighting for a room), controlling personal electronic devices (e.g., a mobile phone), or control of automotive subsystems (e.g., temperature regulation, audio systems, navigation systems).

FMCW radar systems may transmit a frame containing a series of frequency ramps referred to as chirps. These chirps may be reflected by an object back to the FMCW radar system. After receipt of a signal containing the reflected chirps, the FMCW radar system may down-convert, digitize, and process the received signal to determine characteristics of the object. These characteristics can include range, velocity, angle of arrival, etc., of the object when the object is in view of the FMCW radar system.

In at least some FMCW radar systems, multiple sequences of chirps (e.g., such as consecutive sequences of equally spaced chirps) are transmitted and reflections of these chirps received to generate radar signals. After each sequence of chirps, there may be some idle time (e.g., inter-frame idle time) to allow for processing the radar signals resulting from the reflected chirps. The acquisition time of a sequence of chirps and the subsequent inter-frame idle time together may form a radar frame. In at least one example, the reflected signal received by each antenna of the FMCW radar system is mixed with the transmitted signal to generate an intermediate frequency (IF) signal that is filtered and digitized. Signal processing may then be performed on the resulting digital IF signals (e.g., one per receiving antenna in the FMCW radar system) to extract any one or more of the range, velocity, and/or angle of potential objects in the view of the radar.

Effectively recognizing and categorizing gestures benefits from a FMCW radar system with several characteristics. First, sufficiently high velocity resolution provides the ability to detect fine movements, which requires a long frame time. Second, sufficiently high chirp bandwidth provides good range resolution, which requires a longer chirp duration. Third, a relatively high maximum detectable velocity provides the ability to capture faster-moving gestures, which requires a smaller time between chirps. Fourth, sufficiently high angle resolution provides the ability to capture high levels of spatial detail associated with gestures, for example by transmitting chirps/frames from multiple transmit antennas. Finally, a fast update rate provides the ability to capture or sample the relevant dynamics of a fast-moving gesture, which requires frames to be closely spaced (or have a minimal inter-frame idle time). The foregoing requirements, which may be referred to as attributes of operation of the FMCW radar system, have the effect of increasing power consumption of the FMCW radar system as well as creating potential thermal management issues, both of which are undesirable.

In examples of the present disclosure, a FMCW radar system is configured to operate in either a detection mode or a classification mode. While in detection mode, certain attributes of operation of the FMCW radar system are tailored to reduce power consumption, while still being able to detect movement of object(s) in the field of view of the FMCW radar system that could be gestures. For example, the maximum detectable velocity and angle resolution are of a lower priority since no actual gesture classification is being performed. As a result, in detection mode, only a single transmit antenna may be used since angle resolution is a lower priority. Further, in detection mode, the time between chirps may be increased since the maximum detectable velocity is a lower priority.

On the other hand, while in the classification mode, certain attributes of operation of the FMCW radar system are tailored to classify gestures, which, unlike merely detecting movement of object(s) that could be gestures, may require that maximum measureable velocity and angle resolution be of a higher priority. Thus, in classification mode, multiple transmit antennas may be used to improve angle resolution. Further, in classification mode, the time between chirps may be decreased relative to detection mode to improve the maximum detectable velocity.

In certain examples, the FMCW radar system is additionally configured to operate in standby mode, where a slower response time is tolerable, and thus the update rate may be deprioritized. As a result, in standby mode, the inter-frame idle time may be increased, further reducing power consumption.

To determine whether to operate in standby mode, detection mode, or classification mode, the FMCW radar system is configured to compute a motion metric based on detected objects and motion of the detected objects (e.g., velocity of the detected objects). As a result of the motion metric rising above a threshold, which indicates detected motion that could be a gesture, the FMCW radar system is configured to operate in classification mode. As a result of the motion metric falling below the threshold for at least a predetermined amount of time, the FMCW radar system is configured to operate in detection mode (or, in some examples, standby mode). In some examples then, power consumption of the FMCW radar system is reduced in detection mode when gestures are not being performed, while the FMCW radar system retains the ability to switch modes of operation to classification mode to classify or recognize a gesture by a user. Similarly, power consumption of the FMCW radar system is further reduced in standby mode, while the FMCW radar system retains the ability to switch modes of operation to classification mode to classify or recognize a gesture by a user.

Figure 1:
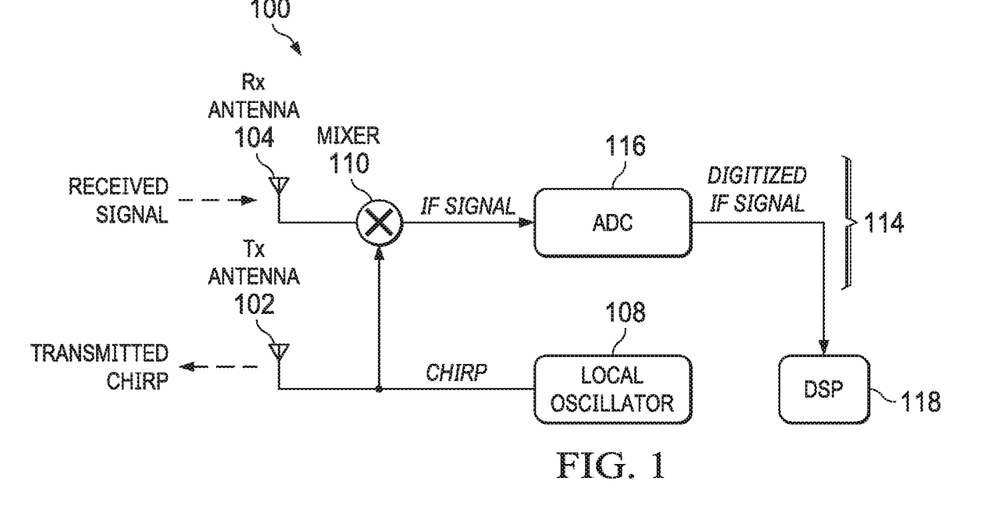
FIG. 1 shows a block diagram of a frequency-modulated continuous wave (FMCW) radar system in accordance with various examples.

FIG. 1 shows a block diagram of an example FMCW radar system 100. The FMCW radar system 100 includes a transmit antenna 102 and a receive antenna 104. In the FMCW radar system 100, a local oscillator 108 generates frequency ramps, referred to as chirps, which are transmitted by the transmit antenna 102. For example, the local oscillator 108 comprises a voltage controlled oscillator (VCO) and the chirps are generated by linearly ramping a control voltage supplied to the VCO. The chirps are also provided to a mixer 110, which is coupled to the local oscillator 108. In at least one example, the FMCW radar system 100 transmits a 4 GHz bandwidth chirp that ramps from 77 GHz to 81 GHz. Multiple chirps are transmitted sequentially in a frame.

The transmitted radar signals are reflected and received by the receive antenna 104. The received radio frequency (RF) signals are mixed with chirps from the local oscillator 108 by a mixer 110 in a receive channel 114, to generate intermediate frequency (IF) signals. IF signals are also referred to as dechirped signals, beat signals, or raw radar signals. An analog-to-digital converter (ADC) 116 in the receive channel 114 digitizes the IF signals. The digital IF signals are sent by the ADC 116 to a digital signal processor (DSP) 118 for further processing. The DSP 118 may perform signal processing on the digital IF signals to extract the range and velocity of objects in view of the FMCW radar system 100. Range refers to the distance of an object from the FMCW radar system 100 and velocity refers to the speed of the object relative to the FMCW radar system 100.

To determine the range, the DSP 118 performs a range fast Fourier transform (FFT) on the digital IF signals corresponding to each chirp in a frame of chirps, to convert the data to the frequency domain. For each of M time samples in a chirp, the DSP 118 computes a range FFT, which yields M range results for the chirp. Thus, for a frame having N chirps, the range FFT generates a range-time array having N×M range values. In the range-time array, the M columns indicate the range values for samples at the same relative time across the N chirps.

To determine the velocity, the DSP 118 performs a Doppler FFT over the range values of the chirps in the frame, which generates a range-Doppler array. That is, the Doppler FFT is performed on each of the M columns of the N×M range-time array. The peaks in the N×M range-Doppler array correspond to the range and relative speed or velocity of objects. The combination of the range FFTs and the Doppler FFTs may be referred to as a two-dimensional (2D) FFT (or 2D FFT processing).

Figure 2:
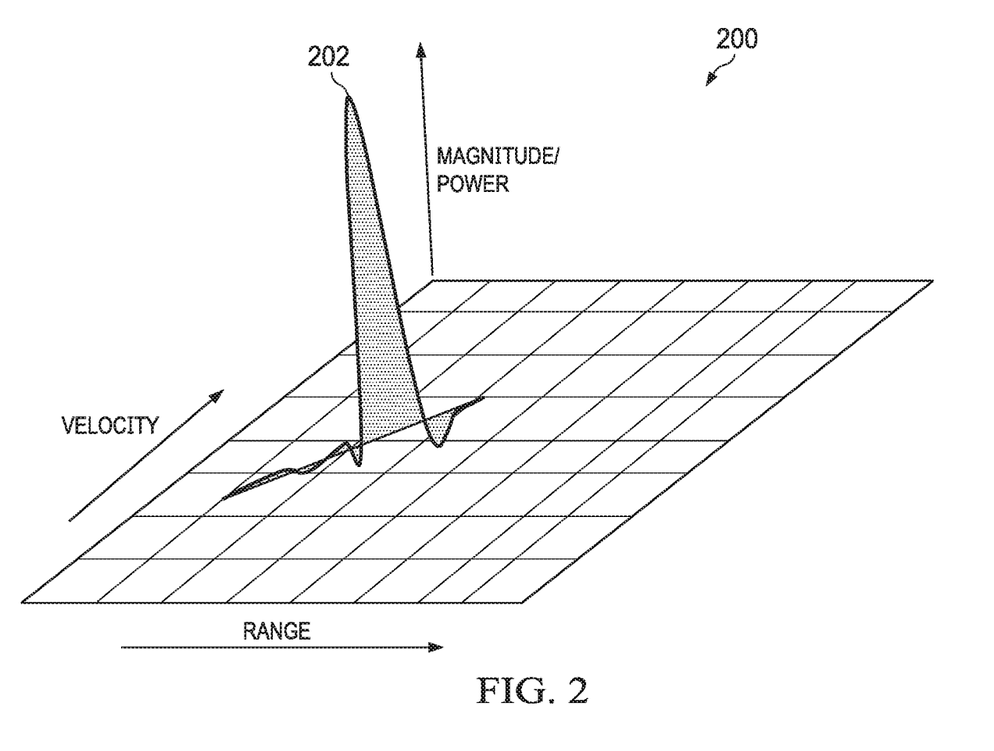
FIG. 2 shows a range-Doppler array in accordance with various examples.

FIG. 2 shows a result (range-Doppler array 200) of the 2D FFT processing on a frame of chirps, which resolves a scene into a 2D grid with range and velocity on the two axes. The cells in this grid are commonly referred to as bins. A peak 202 in a curve in the 2D grid indicates an object in the scene. The coordinates of such a peak 202 in the curve in the range-velocity plane indicate the range and velocity of the object. The DSP 118 or other processor performs an object detection algorithm to detect peaks 202 in the 2D FFT grids. Additionally, the DSP 118 may track the detected objects across frames.

Multiple objects with the same range and relative velocity with respect to the FMCW radar system 100, but at different angles, may be placed in the same bin in the 2D grid. In some examples, two or more transmit antennas generate chirps that are interleaved within a frame to discriminate multiple objects in the same bin by determining the angle of the objects. In other examples, two or more receive antennas may be used to discriminate multiple objects in the same bin by determining the angle of the objects. The use of multiple transmit and/or multiple receive antennas improves the angle resolution capability of the radar system. A third FFT, an angle FFT, is performed across the 2D FFT grids (one 2D FFT grid being computed for each transmit-receive antenna pair), to determine the angles for the objects. Accordingly, objects with similar range and velocity, but different angles are resolved. The angle may be the azimuth angle and/or the elevation angle, depending on the orientation and shape of the receive antennas. When multiple antennas are used, the range-Doppler arrays for the antennas are averaged (e.g., non-coherently summed) together to increase accuracy.

The FMCW radar system 100 is thus capable of measuring the range (distance from the radar), velocity (relative velocity with respect to the radar) and angle of objects (with two or more transmit and/or receive antennas) in the field of view of the radar. As explained above, the FMCW radar system 100 is configured to operate in either detection mode or classification mode or, in some examples, standby mode.

Figure 3A:
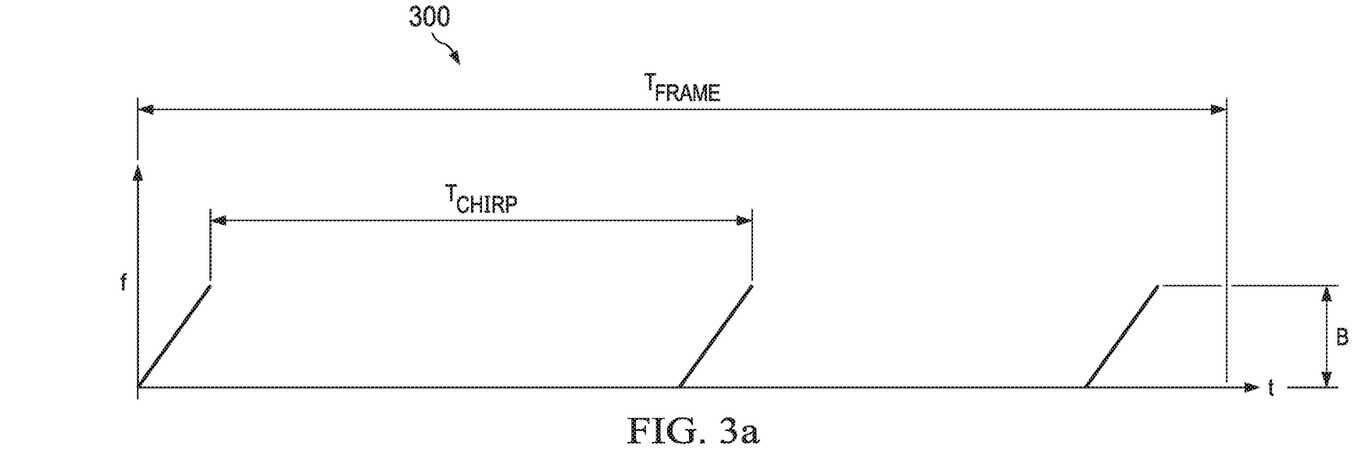
FIGS. 3a and 3b show FMCW radar frames in a detection mode and a classification mode in accordance with various examples.

FIG. 3a shows a frame 300 of the FMCW radar system 100 operating in detection mode, where the FMCW radar system 100 detects the start of an intended gesture. In the frame 300, the time between chirps ($T_{chirp}$) is relatively long, since the maximum detectable velocity is not a priority when gesture classification is not being performed. Further, in the frame 300, the chirps are generated by a single transmit antenna, since angle resolution is not a priority when gesture classification is not being performed. By increasing $T_{chirp}$ and transmitting only using a single antenna, power consumption is reduced during detection mode. Additionally, in detection mode, additional power may be saved by using only a single receive antenna.

During detection mode, certain attributes of operation of the FMCW radar system 100 remain the same or approximately the same as during classification mode, which allows the FMCW radar system 100 to accurately detect the start of an intended gesture, while still benefitting from the reduced power consumption explained above. For example, the duration of the frame 300 ($T_{frame}$) remains relatively long (e.g., the same as $T_{frame}$ in classification mode), allowing for good velocity resolution. Similarly, the bandwidth of each chirp (B) remains relatively large (e.g., the same as B in classification mode), allowing for good range resolution. Further, the inter-frame idle time (not shown for brevity) remains sufficiently short (e.g., the same as in classification mode), allowing for a high update or sample rate to capture the relevant dynamics of a fast-moving gesture, which enables a more rapid transition from detection mode to classification mode.

In examples where the FMCW radar system 100 is configured to operate in standby mode, certain attributes of operation of the FMCW radar system 100 remain the same or approximately the same as during detection mode, except that the inter-frame idle time may be increased, further reducing power consumption. Although the FMCW radar system 100 has a slower response time in standby mode than in detection mode, owing to the increased inter-frame idle time, a user is still able to perform certain positional cues (e.g., placing their hand in front of the FMCW radar system 100 for a certain amount of time) which allows the FMCW radar system 100 to accurately detect the user's intention to begin gesturing, while benefitting from additional reduced power consumption.

Figure 3B:
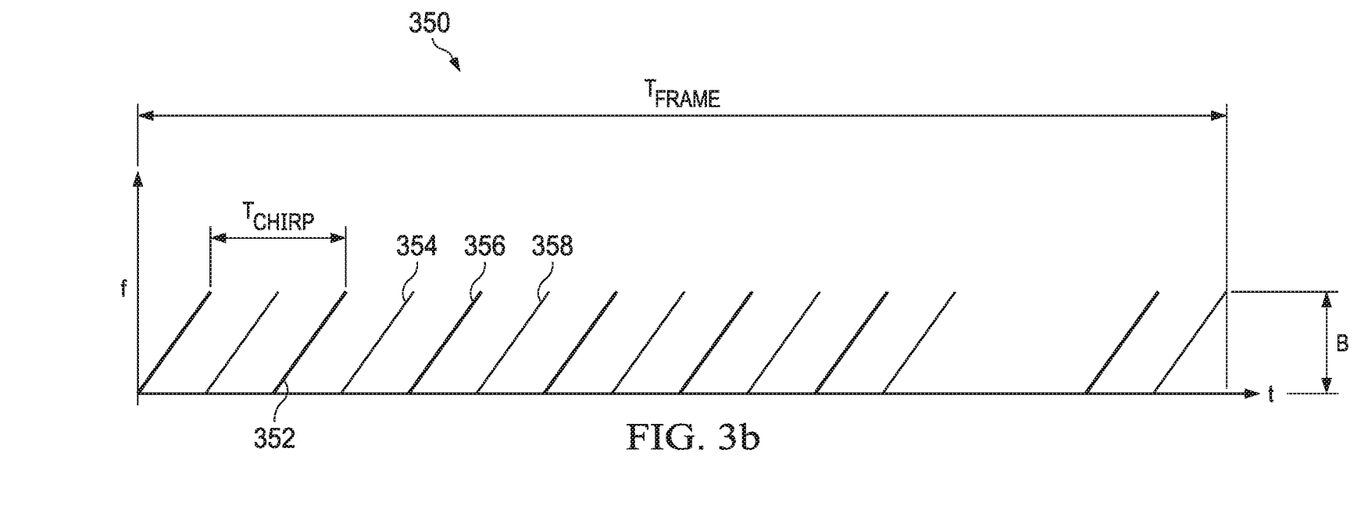

FIG. 3b shows a frame 350 of the FMCW radar system 100 operating in classification mode, where the FMCW radar system 100 classifies one or more gestures based on features extracted from the received radar signals. In the frame 350, $T_{chirp}$ is shortened relative to detection mode above, which allows for an increased maximum detectable velocity to assist in classifying the one or more gestures. Further, in the frame 350, the chirps are generated by multiple transmit antennas in an interleaved manner, allowing for enhanced angle resolution. For example, the chirps 352, 356 are generated by a first transmit antenna while the chirps 354, 358 are generated by a second transmit antenna. In certain examples, additional transmit antennas such as a third transmit antenna may be utilized to further improve the angle resolution of FMCW radar system 100. Additionally, in classification mode, multiple receive antennas may be utilized to improve the angle resolution of the FMCW radar system 100.

Gestures may be classified based on an analysis of the range-Doppler arrays 200 over time. For example, gestures may be classified based on the velocity component of the range-Doppler array 200, where a positive velocity peak indicates an object (e.g., a user's hand) is moving toward the FMCW radar system 100 and a negative velocity peak indicates the object is moving away from the FMCW radar system 100. As a further example, a range-Doppler array 200 in which a positive velocity peak transitions quickly to a negative velocity peak may indicate a waving motion. In other examples, angle detection allows for determination of rotational movements, such as moving a finger or a hand in a circular motion. Additional types of gesture classification may be based on, for example, distance, velocity, and angle information of one or more detected objects.

Figure 4A:
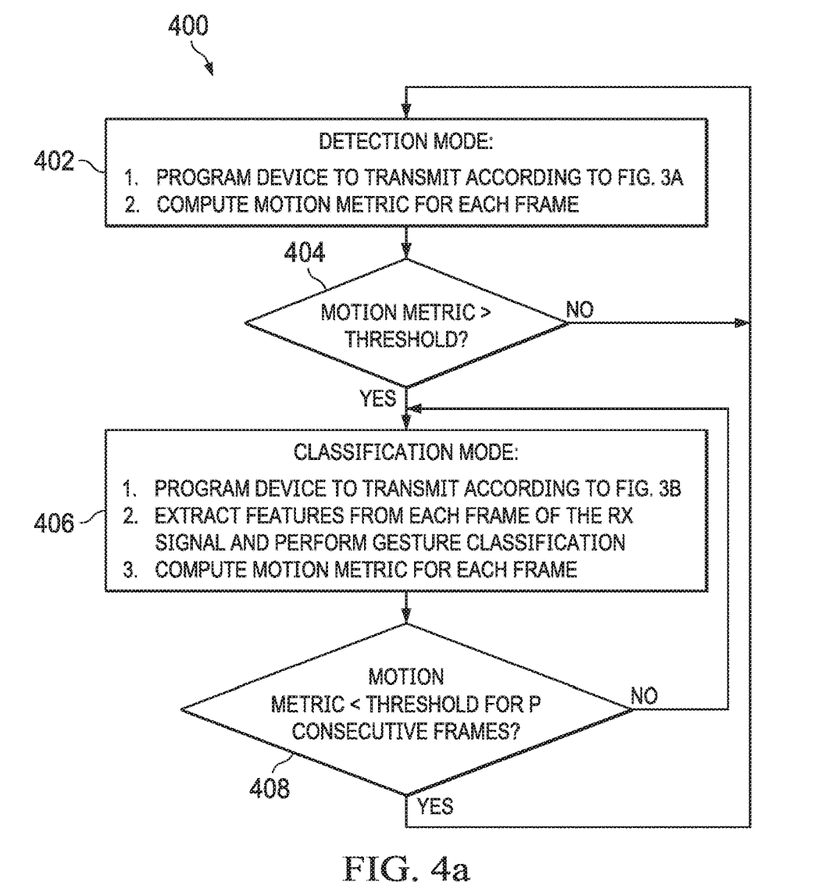
FIGS. 4a and 4b show flow charts of methods for operating a FMCW radar system in accordance with various examples.

The DSP 118 or another processor is configured to compute a motion metric based on the digital IF signals, to determine whether the FMCW radar system 100 operates in detection mode or classification mode. FIG. 4a shows a flow chart of a method 400 of operating the FMCW radar system 100 in accordance with examples of the present disclosure. The method 400 begins in block 402 in detection mode, with the FMCW radar system 100 transmitting frames as shown in FIG. 3a and computing the motion metric for each frame. The method 400 continues in block 404, in which the motion metric is compared to a threshold, which may be determined experimentally, for example based on an intended use case or an environment for a given FMCW radar system 100. If the motion metric is below the threshold, the method 400 returns to block 402 and the FMCW radar system 100 continues to operate in detection mode.

However, if the motion metric is above the threshold, the method 400 continues to block 406 and the FMCW radar system 100 enters classification mode. When the FMCW radar system 100 operates in classification mode in block 406, the FMCW radar system 100 transmits frames as shown in FIG. 3b, and extracts features from the digital IF signals (e.g., after 2D FFT processing) to perform gesture classification. The method 400 continues in block 408, in which the motion metric is compared to the threshold. If the motion metric is above the threshold (or falls below the threshold for less than a predetermined amount of time, P consecutive frames for example), the method 400 returns to block 406, and the FMCW radar system 100 continues to operate in classification mode. On the other hand, if the motion metric falls below the threshold for at least P consecutive frames, the method 400 returns to block 402, and the FMCW radar system 100 returns to operate in detection mode, reducing the power consumption of the system when a gesture is not being performed (e.g., as indicated by the motion metric).

Figure 4B:
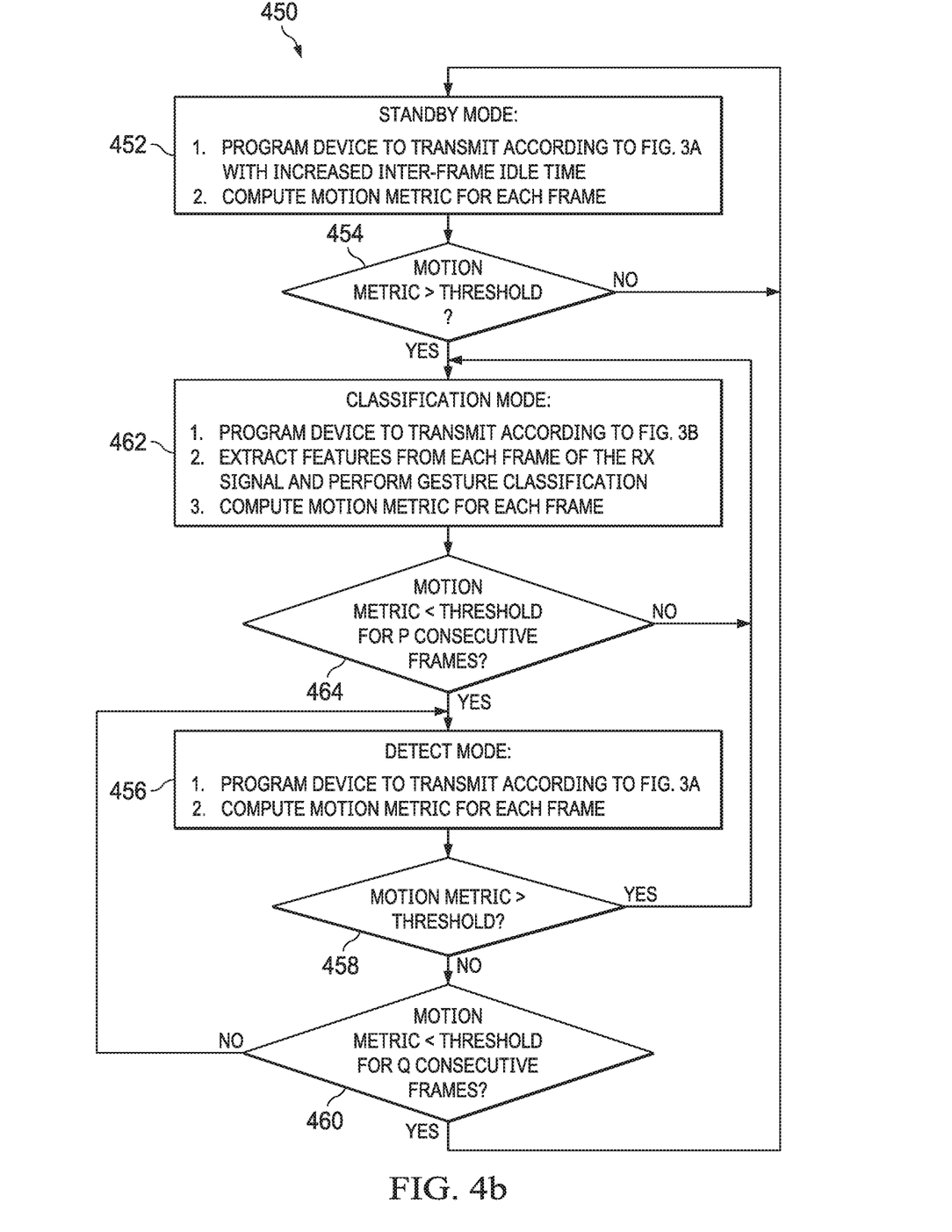

FIG. 4b shows a flow chart of another method 450 of operating the FMCW radar system 100, which includes a standby mode in accordance with examples of the present disclosure. The method 450 begins in block 452 in standby mode with the FMCW radar system 100 transmitting frames as shown in FIG. 3a, but with an increased inter-frame idle time to prioritize reduced power consumption. While in standby mode in block 452, the method 450 also includes computing the motion metric for each frame. The method 450 continues in block 454 in which the motion metric is compared to a threshold. If the motion metric is below the threshold, the method 450 returns to block 452 and the FMCW radar system 100 continues to operate in standby mode.

However, if the motion metric is above the threshold, the method 450 continues to block 462, and the FMCW radar system 100 enters classification mode. When the FMCW radar system 100 operates in classification mode as in block 462, the FMCW radar system 100 transmits frames as shown in FIG. 3b and extracts features from the digital IF signals (e.g., after 2D FFT processing) to perform gesture classification. The method 450 continues in block 464, in which the motion metric is compared to the threshold. If the motion metric is above the threshold (or falls below the threshold for less than a predetermined amount of time, P consecutive frames for example), the method 450 returns to block 462 and the FMCW radar system 100 continues to operate in classification mode.

On the other hand, if the motion metric falls below the threshold for at least P consecutive frames, the method 450 continues to block 456, and the FMCW radar system 100 enters detection mode, reducing the power consumption of the system relative to classification mode when a gesture is not being performed (e.g., as indicated by the motion metric). In detection mode in block 456, the FMCW radar system 100 transmits frames as shown in FIG. 3*a* and computes the motion metric for each frame. The method 450 continues in block 458 in which the motion metric is compared to the threshold. If the motion metric is above the threshold, the method 450 continues to block 462 and the FMCW radar system 100 enters classification mode, with the method 450 continuing as explained above. If the motion metric is below the threshold, the method 450 continues to block 460, where it is determined if the motion metric is below the threshold for a predetermined amount of time, Q consecutive frames in this example. If the motion metric is not below the threshold for at least Q consecutive frames, then the method 450 returns to block 456 and the FMCW radar system 100 continues to operate in detection mode, with the method 450 continuing as explained above. If the motion metric is below the threshold for at least Q consecutive frames, then the method 450 returns to block 452 and the FMCW radar system 100 enters standby mode, with the method 450 continuing as explained above.

In the method 450, Q may be greater than P, such that a device in classification mode (block 462, 464) switches to detection mode (block 456) after a period of P consecutive frames of "no gestures," or where the motion metric is below the threshold. Similarly, a device in detection mode (block 456, 458, 460) switches to standby mode after a period of Q consecutive frames of "no gestures," or where the motion metric is below the threshold. In at least one example, P consecutive frames may correspond to approximately a few to tens of seconds, while Q consecutive frames may correspond to a minute or more.

Figure 5:
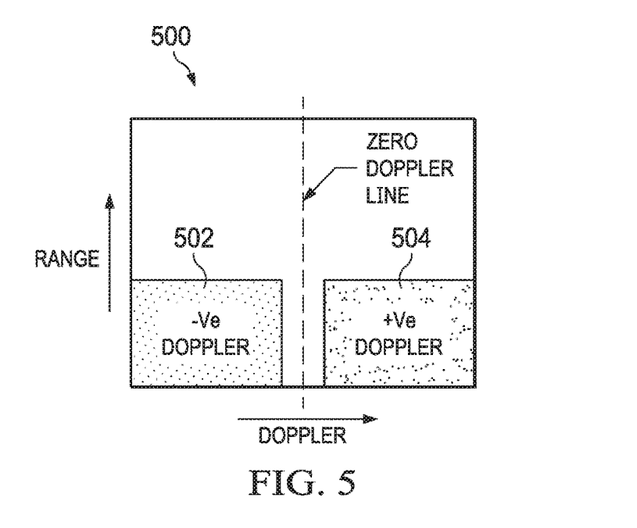
FIG. 5 shows a range-Doppler array for computing a motion metric in accordance with various examples.

FIG. 5 shows an example of computing the motion metric, including a range-Doppler array 500, similar to the array 200 described above with respect to FIG. 2 except viewed from above. The range-Doppler array 500 includes regions 502, 504, which are a subset of the range-Doppler array 500. The DSP 118 or other processor may compute the motion metric by computing a total energy (e.g., by integrating the distribution shown in FIG. 2) in the regions 502, 504 of the range-Doppler array.

In some examples, the regions 502, 504 are bounded in order to restrict the motion metric computation to only moving objects (i.e., having a non-zero velocity, or a velocity greater than a minimum velocity threshold). This avoids stationary objects in view of the radar system 100 from contributing to the motion metric, possibly erroneously causing a switch to classification mode despite no gesture being performed.

Similarly, in some examples, the regions 502, 504 are bounded in order to restrict the motion metric computation only to objects closer to the radar system or having a range less than a maximum distance threshold. This avoids background objects/movement in view of the radar system 100 from contributing to the motion metric, possibly erroneously causing a switch to classification mode even though the movement detected was merely background movement (e.g., in a large room where the radar system is part of a thermostat).

Figure 6:
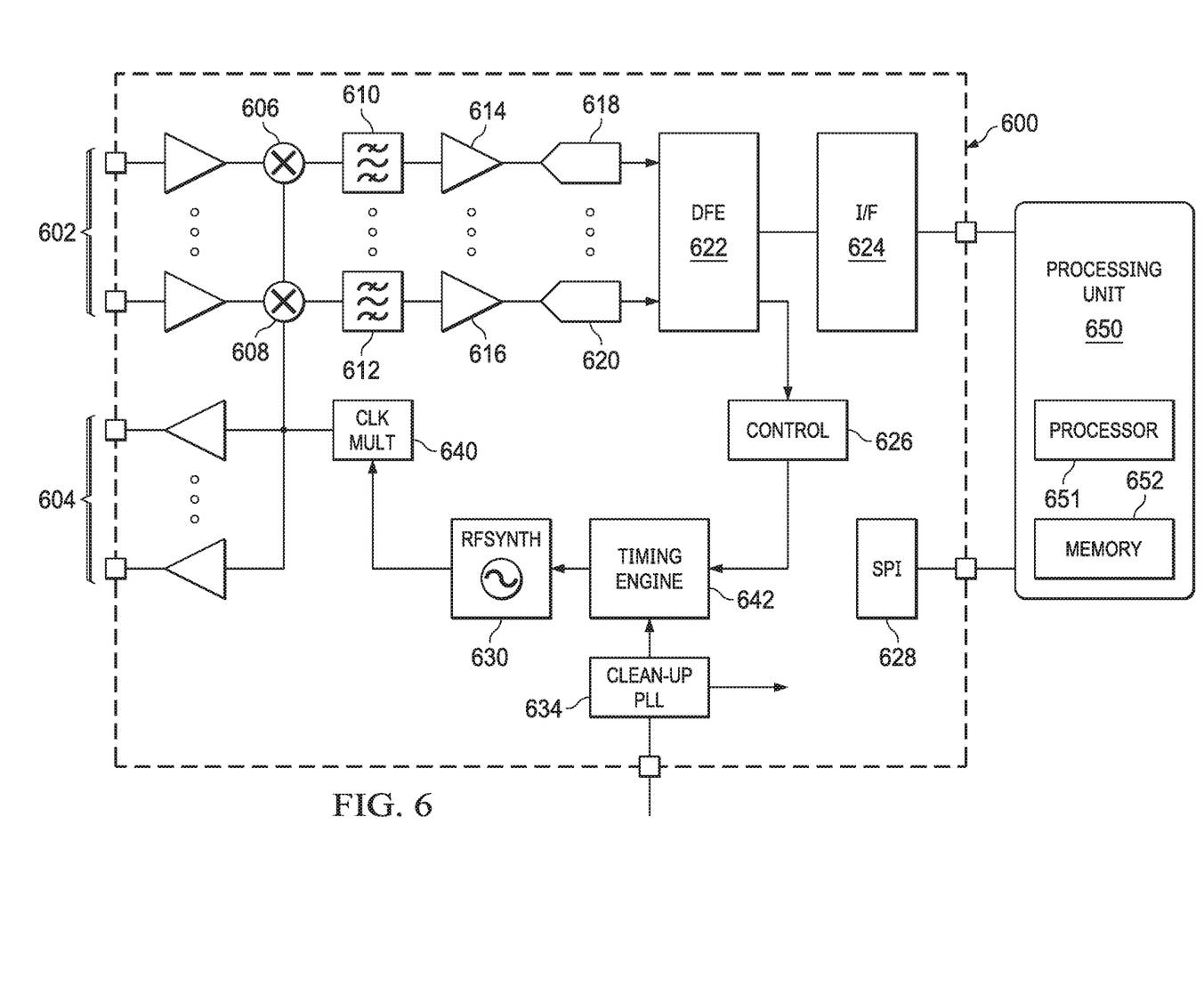
FIG. 6 shows a block diagram of a FMCW radar system including a FMCW radar system-on-a-chip (SOC) in accordance with various examples.

FIG. 6 shows a block diagram of an example FMCW radar system configured to support gesture recognition and switch between detection mode and operation mode, as explained above. The radar system includes a processing unit 650 and an FMCW radar system-on-a-chip (SOC) 600. In some examples, the processing unit 650 is integrated into the FMCW radar SOC 600. The radar SOC 600 may include multiple transmit channels 604 for transmitting FMCW signals and multiple receive channels 602 for receiving the reflected transmitted signals. Further, the number of receive channels may be larger than the number of transmit channels. For example, the radar SOC 600 may have two transmit channels and four receive channels. A transmit channel includes a suitable transmitter and antenna. A receive channel includes a suitable receiver and antenna. Further, each of the receive channels 602 are identical and include a mixer 606, 608 to mix the transmitted signal with the received signal to generate a beat signal (alternatively referred to as a dechirped signal, intermediate frequency (IF) signal, or raw radar signal), a baseband bandpass filter 610, 612 for filtering the beat signal, a variable gain amplifier (VGA) 614, 616 for amplifying the filtered beat signal, and an analog-to-digital converter (ADC) 618, 620 for converting the analog beat signal to a digital beat signal.

The receive channels 602 are coupled to a digital front end (DFE) 622 that performs decimation filtering on the digital beat signals to reduce the sampling rate and bring the signal back to baseband. The DFE 622 may also perform other operations on the digital beat signals, e.g., direct current (DC) offset removal. The DFE 622 is coupled to high speed interface component 624 to transfer the output of the DFE 622 to the processing unit 650.

The processing unit 650 may perform all or portions of the method of operating the radar system of FIG. 4 on the received digital beat signals. The processing unit 650 may include any suitable processor or combination of processors 651. For example, the processing unit 650 may be a digital signal processor, a microcontroller unit (CMU), an FFT engine, a DSP+MCU processor, a field programmable gate array (FPGA), or an application specific integrated circuit (ASIC). As explained above, in certain examples, the processing unit 650 and/or the memory component 652 are integrated into the FMCW radar SOC 600.

The memory component 652 provides storage, e.g., a non-transitory computer readable medium, which may be used, for example, to store software instructions executed by processing unit 650, such as any software instructions for implementing gesture recognition and switching between detection mode and operation mode as explained above. The memory component 652 may also store dechirped ADC data, range-Doppler arrays, and other data useful for computing the motion metric described above. The memory component 652 may include any suitable combination of read-only memory (ROM) and/or random access memory (RAM), e.g., static RAM.

The control component 626 includes functionality to control the operation of the radar SOC 600. The control component 626 may include, for example, an MCU that executes software to control the operation of the radar SOC 600 between detection mode and operation mode.

The serial peripheral interface (SPI) 628 provides an interface for communication with the processing unit 650. For example, the processing unit 650 may use the SPI 628 to send control information, e.g., timing and frequencies of chirps, enabling of and timing between transmit antennas, output power level, triggering of monitoring functions, etc., to the radar SOC 600.

The programmable timing engine 642 includes functionality to receive chirp parameter values for a sequence of chirps in a radar frame from the control component 626 and to generate chirp control signals that control the transmission and reception of the chirps in a frame based on the parameter values, including timing between chirps generated by different transmit antennas in classification mode, and between chirps generated by the same transmit antenna in detection mode.

The radio frequency synthesizer (RFSYNTH) 630 includes functionality to generate FMCW signals for transmission based on chirp control signals from the timing engine 642. In some examples, the RFSYNTH 630 includes a phase locked loop (PLL) with a voltage controlled oscillator (VCO).

The clock multiplier 640 increases the frequency of the transmission signal from the RFSYNTH 630 to the frequency of the mixers 606, 608. The clean-up PLL (phase locked loop) 634 operates to increase the frequency of the signal of an external low frequency reference clock (not shown) to the frequency of the RFSYNTH 630 and to filter the reference clock phase noise out of the clock signal.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method of operating a frequency modulated continuous wave (FMCW) radar system, the method comprising:
    receiving, by at least one processor, digital intermediate frequency (IF) signals from a mixer coupled to a receive antenna;
    performing, by the at least one processor, a two-dimensional (2D) fast Fourier transform (FFT) on the digital IF signals to generate a range-Doppler array;
    computing, by the at least one processor, a total energy in a subset of the range-Doppler array;
    determining, by the at least one processor, a motion metric based on the computer total energy;
    operating, by the at least one processor, the FMCW radar system in a classification mode, in response to determining that the motion metric is above a threshold; and
    operating, by the at least one processor, the FMCW radar system in a detection mode, in response to determining that the motion metric is below the threshold for at least a first amount of time;
    wherein an amount of power consumed by the FMCW radar system in the detection mode is less than an amount of power consumed by the FMCW radar system in the classification mode.

2. The method of claim 1, wherein the subset comprises bins of the range-Doppler array having a velocity greater than a minimum velocity threshold.

3. The method of claim 1, wherein the subset comprises bins of the range-Doppler array having a range less than a maximum distance threshold.

4. The method of claim 1, wherein the subset comprises bins of the range-Doppler array having a velocity greater than a minimum velocity threshold and a range less than a maximum distance threshold.

5. The method of claim 1, wherein operating the FMCW radar system in the classification mode further comprises:
    transmitting a frame of chirps from a plurality of transmit antennas in an interleaved manner;
    wherein a time between consecutive chirps in the classification mode is less than a time between consecutive chirps in the detection mode.

6. The method of claim 1, wherein operating the FMCW radar system in the classification mode further comprises:
    processing the digital IF signals to determine whether a gesture was performed; and
    in response to determining that a gesture was performed, classifying the gesture.

7. The method of claim 1, wherein operating the FMCW radar system in the detection mode further comprises:
    transmitting a frame of chirps from a single transmit antenna;
    wherein a time between consecutive chirps in the detection mode is greater than a time between consecutive chirps in the classification mode.

8. The method of claim 1, further comprising:
    operating the FMCW radar system in a standby mode, in response to determining that the motion metric is below the threshold for at least a second amount of time, the second amount of time being greater than the first amount of time;
    wherein an amount of power consumed by the FMCW radar system in the standby mode is less than an amount of power consumed by the FMCW radar system in the detection mode.

9. The method of claim 8, wherein operating the FMCW radar system in the standby mode further comprises:
    transmitting a plurality of frames of chirps from a single transmit antenna;
    wherein an inter-frame idle time in the standby mode is greater than an inter-frame idle time in the detection mode.

10. A frequency modulated continuous wave (FMCW) radar system, comprising:
    a receive antenna;
    a receive channel coupled to the receive antenna, the receive channel configured to generate a digital intermediate frequency (IF) signal from a radio frequency signal received by the receive antenna; and
    a processor coupled to the receive channel, the processor configured to:

perform a two-dimensional (2D) fast Fourier transform (FFT) on the digital IF signals to generate a range-Doppler array;

computer a total energy in a subset of the range-Doppler array;

determine a motion metric based on the computer total energy;

operate the FMCW radar system in a classification mode, in response to determining that the motion metric is above a threshold; and operate the FMCW radar system in a detection mode, in response to determining that the motion metric is below the threshold for at least a first amount of time;

wherein an amount of power consumed by the FMCW radar system in the detection mode is less than an amount of power consumed by the FMCW radar system in the classification mode.

11. The FMCW radar system of claim 10, wherein the subset comprises bins of the range-Doppler array having a velocity greater than a minimum velocity threshold.

12. The FMCW radar system of claim 10, wherein the subset comprises bins of the range-Doppler array having a range less than a maximum distance threshold.

13. The FMCW radar system of claim 10, wherein the subset comprises bins of the range-Doppler array having a velocity greater than a minimum velocity threshold and a range less than a maximum distance threshold.

14. The FMCW radar system of claim 10, further comprising:
a plurality of transmit antennas;
wherein in the classification mode, the processor is configured to cause the transmit antennas to transmit a frame of chirps in an interleaved manner;
wherein a time between consecutive chirps in the classification mode is less than a time between consecutive chirps in the detection mode.

15. The FMCW radar system of claim 14, wherein in the detection mode, the processor is further configured to cause a single transmit antenna to transmit a frame of chirps, wherein a time between consecutive chirps in the detection mode is greater than a time between consecutive chirps in the classification mode.

16. The FMCW radar system of claim 10, wherein in the classification mode, the processor is further configured to:
process the digital IF signals to determine whether a gesture was performed; and
in response to a determination that a gesture was performed, classify the gesture.

17. The FMCW radar system of claim 10, wherein the processor is further configured to:
operate the FMCW radar system in a standby mode, in response to determining that the motion metric is below the threshold for at least a second amount of time, the second amount of time being greater than the first amount of time;
wherein an amount of power consumed by the FMCW radar system in the standby mode is less than an amount of power consumed by the FMCW radar system in the detection mode.

18. The FMCW radar system of claim 17, wherein in standby mode, the processor is further configured to cause a single antenna to transmit a plurality of frames of chirps, wherein an inter-frame idle time in the standby mode is greater than an inter-frame idle time in the detection mode.

* * * * *